US011243956B1

(12) United States Patent
Papakonstantinou et al.

(10) Patent No.: US 11,243,956 B1
(45) Date of Patent: Feb. 8, 2022

(54) ENFORCING FOREIGN KEY CONSTRAINTS FOR EFFICIENT MATERIALIZED VIEW UPDATES

(71) Applicant: Amazon Technologies, Inc., Seattle, WA (US)

(72) Inventors: Yannis Papakonstantinou, La Jolla, CA (US); Vuk Ercegovac, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 16/508,206

(22) Filed: Jul. 10, 2019

(51) Int. Cl.
*G06F 16/2455* (2019.01)
*G06F 16/23* (2019.01)
*G06F 16/22* (2019.01)
*G06F 16/21* (2019.01)

(52) U.S. Cl.
CPC ...... *G06F 16/24565* (2019.01); *G06F 16/211* (2019.01); *G06F 16/2282* (2019.01); *G06F 16/2393* (2019.01); *G06F 16/2456* (2019.01)

(58) Field of Classification Search
None
See application file for complete search history.

(56) References Cited

U.S. PATENT DOCUMENTS

| | | | |
|---|---|---|---|
| 6,542,883 B1* | 4/2003 | Salo | G06F 16/24553 |
| 6,850,933 B2 | 2/2005 | Larson et al. | |
| 6,882,993 B1 | 4/2005 | Lawande et al. | |
| 8,918,380 B2* | 12/2014 | Sjogren | G06F 16/27 |
| | | | 707/703 |
| 2005/0235004 A1* | 10/2005 | Folkert | G06F 16/2393 |
| 2007/0192283 A1* | 8/2007 | Larson | G06F 16/2453 |
| 2008/0120273 A1* | 5/2008 | Ramesh | G06F 16/24545 |
| 2012/0158795 A1* | 6/2012 | Ireland | G06F 16/2393 |
| | | | 707/803 |
| 2015/0019484 A1* | 1/2015 | Mack | G06F 16/212 |
| | | | 707/622 |

* cited by examiner

*Primary Examiner* — Uyen T Le
(74) *Attorney, Agent, or Firm* — Robert C. Kowert; Kowert, Hood, Munyon, Rankin & Goetzel, P.C.

(57) ABSTRACT

Databases may enforce foreign key constraints for efficient materialized view updates. A materialized view may be created for a database. Updates to the database may be received and performed according to a foreign key constraint enforced with respect to the updates. An update to the materialized view may be performed to make the materialized view consistent with the updates to the database. Performance of a join operation to update the materialized view that would return a result violating the foreign key constraint may be excluded from the update to the materialized view.

20 Claims, 8 Drawing Sheets

ENFORCING FOREIGN KEY CONSTRAINTS FOR EFFICIENT MATERIALIZED VIEW UPDATES

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

For example, data processing is often measured by the speed at which requests to access data are performed. Many types of data access requests require intensive computational and storage access workloads. As data stores may have to process high workload access requests, techniques that reduce computational load, such as techniques that provide materialized views, may be implemented. Techniques that improve the maintenance of materialized views offer further performance improvements and are highly desirable.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of enforcing foreign key constraints for efficient materialized view updates are described herein. Materialized views may be created for databases to offer a performance benefit to client applications because the results of a query stored as a materialized view may not have to be performed again in order to obtain information already found in the materialized view, in various embodiments. Materialized views, however, can become stale or out of sync with recent updates to a database. For example, updates to a database may add additional data, modify existing data, delete or remove data, alter data schemas for data, among other updates. In order to continue to offer useful information, a materialized view may be updated to be consistent with updates made to the database.

Keeping a materialized view up to date, however, is not without costs. The updates to the database may or may not affect the materialized view. The difference, therefore, between the database as updated and the version of the database used to create the materialized view may be identified and evaluated to determine what updates, if any, should be performed. Gathering the information to make materialized view updates may be similar to the performance of a query. Therefore, optimizations that can reduce the work for updating a materialized view, can reduce the impact that updates to a materialized view may have on other work (e.g., other client requests or background operations) being performed at the database, improving the performance of the database overall.

Figure 1:
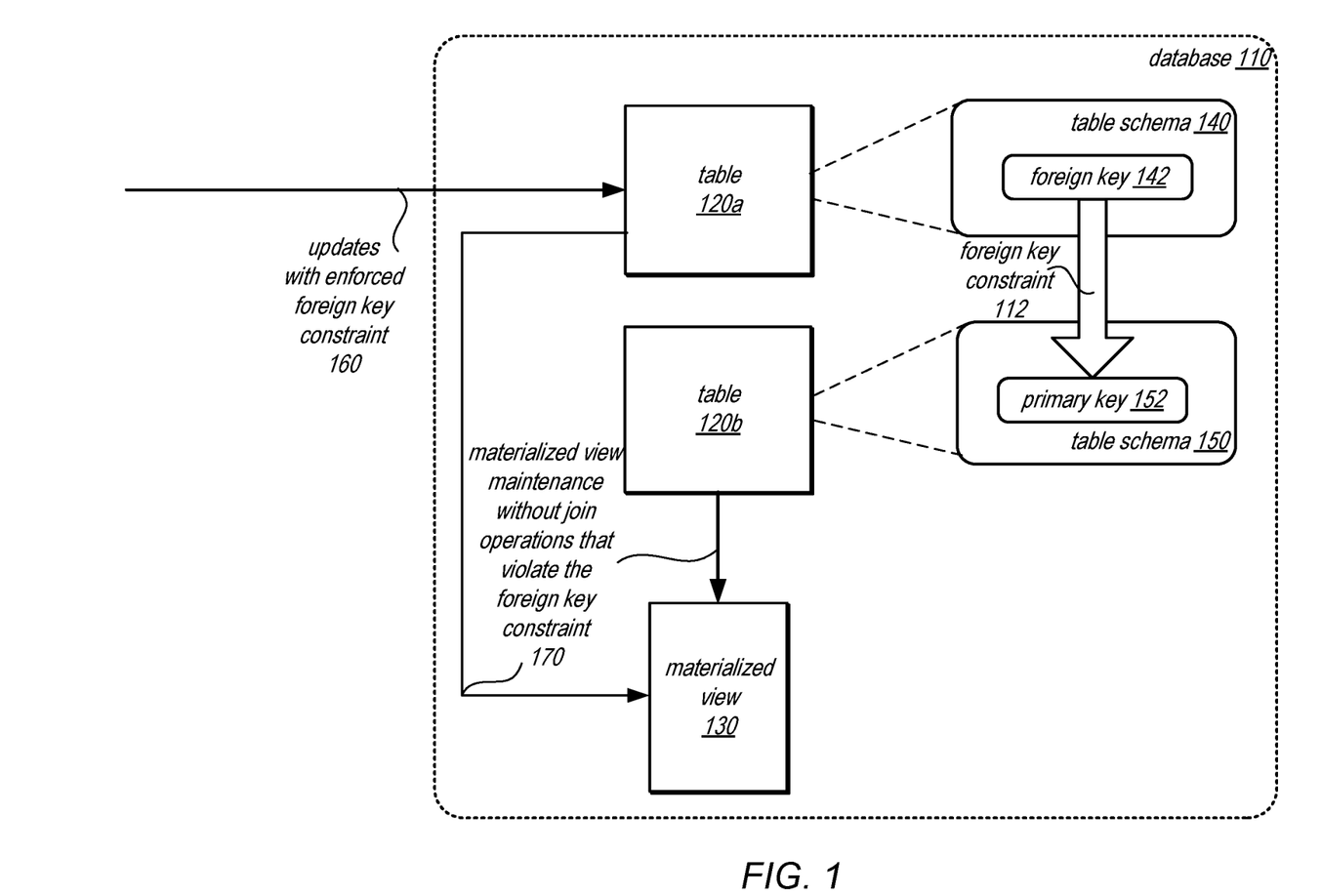
FIG. 1 is a logical block diagram illustrating enforcing foreign key constraints for efficient materialized view updates, according to some embodiments

FIG. 1 is a logical block diagram illustrating enforcing foreign key constraints for efficient materialized view updates, according to some embodiments. Schemas for databases, such as table schemas and other information that describe how a database is defined as well as how to process access requests (e.g., queries and other database updates) to the database, may include features to link related data across different collections of items, like database tables. One such link may be a foreign key, in some embodiments. As illustrated in FIG. 1, a foreign key 142 in table schema 140 (for table 120*a* in database 110) may be the same value as a primary key in table schema 150 for table 120*b*, such as primary key 152. Foreign key constraint 112 may be a constraint that limits the inclusion of items in table 120a corresponding to table schema 140 to those items with a foreign key value that matches a primary key 152 value in table 120b corresponding to table schema 150.

Consider the example table schema as may be specified by a create statement:
CREATE TABLE Dimension (
ID PRIMARY KEY,
feature INTEGER,
)
This schema includes a primary key that is referenced by another table illustrated by the example create statement below:
CREATE TABLE Fact (
    dimensionID INTEGER REFERENCES Dimension(ID),
    measure INTEGER,
)

As depicted above, dimensionID for the Fact table references the ID primary key of the Dimension table. In various embodiments, a key word or other feature may explicitly identify the foreign key constraint, such as "REFERENCES" in the example above. In other embodiments, different key words, parameters, features or settings which specify or automatically apply a foreign key constraint may be performed.

When updates are made to tables, these updates may include changes to add, modify, or remove data that effects the link established by foreign key constraint 112. Thus, in various embodiments, updates may be performed with the foreign key constraint enforced, as indicated at 160. For example, if an update adds a record (e.g., a tuple) to table 120a that corresponds to table schema 140, then the added record will be checked to see if the foreign key value matches an existing foreign key value in the table being referenced, such as the table corresponding to table schema 150. Different techniques for enforcing the schema may be applied, as discussed below with regard to FIGS. 5 and 7.

Materialized view 130 in database 110 may be created from a query that relies on or includes the relationship between foreign key 142 and primary key 152. For instance, the example creation statement below illustrates a JOIN operation that may link data from the example tables discussed above:
CREATE MATERIALIZED VIEW factDimensionJoin AS (
SELECT d.feature, SUM(f.measure)
FROM Fact f, Dimension d
WHERE f.dimensionID=d.ID
GROUP BY d.feature
)
In this example, the WHERE clause utilizes a join between "f.dimensionID" with "d.ID" to obtain related data from both tables (e.g., "d.feature" and "f.measure").

While a join operation may be appropriate for the first time the query is executed to create materialized view 130 (e.g., to join "f.dimensionID" with "d.ID"), subsequent updates may be made to materialized view in which a join operation incurs a heavy workload (e.g., scanning both tables to identify matching values). Incremental updates, such as materialized view maintenance 170, may be performed to exclude join operations that violate the foreign key constraint as no such items would exist in tables 120 because the foreign key constraint is enforced. For example, consider a scenario where at "time 0" the factDimensionJoin is up-to-date. Between "time 0" and "time 1", tuples have been inserted in both the Fact and the Dimension tables. Tuples inserted into Fact table may be referred to as deltaInsert Fact and tuples inserted into the Dimension table as deltaInsert Dimension. If the foreign key constraint were not enforced, then an update to the materialized view would need to include in the materialized view the result of a join operation:
deltaInsert Dimension d JOIN (Fact–deltaInsert Fact) f ON f.dimensionID=d.ID.

If foreign key constraints were enforced, then no record would exist in the Fact table that would satisfy this join operation. Removing join operations like the example above can greatly increase the performance of updates to materialized views, which in turn increases the performance benefits to other database workloads (e.g., other queries or updates).

Please note that the previous description of a database, table, materialized view, table schema, foreign key, primary key, and various interactions are logical descriptions and thus is not to be construed as limiting as to the implementation of these features.

This specification begins with a general description of a provider network that implements database services (or other data storage or processing services) that may implement using computer resources to perform database queries and implement materialized views, including enforcing foreign key constraints for efficient materialized view updates. Then various examples of one such database service, including different components/modules, or arrangements of components/module that may be employed as part of implementing the techniques are discussed. A number of different methods and techniques to implement enforcing foreign key constraints for efficient materialized view updates, some of which are illustrated in accompanying flowcharts, are then discussed. Finally, a description of an example computing system upon which the various components, modules, systems, devices, and/or nodes may be implemented is provided. Various examples are provided throughout the specification.

Figure 2:
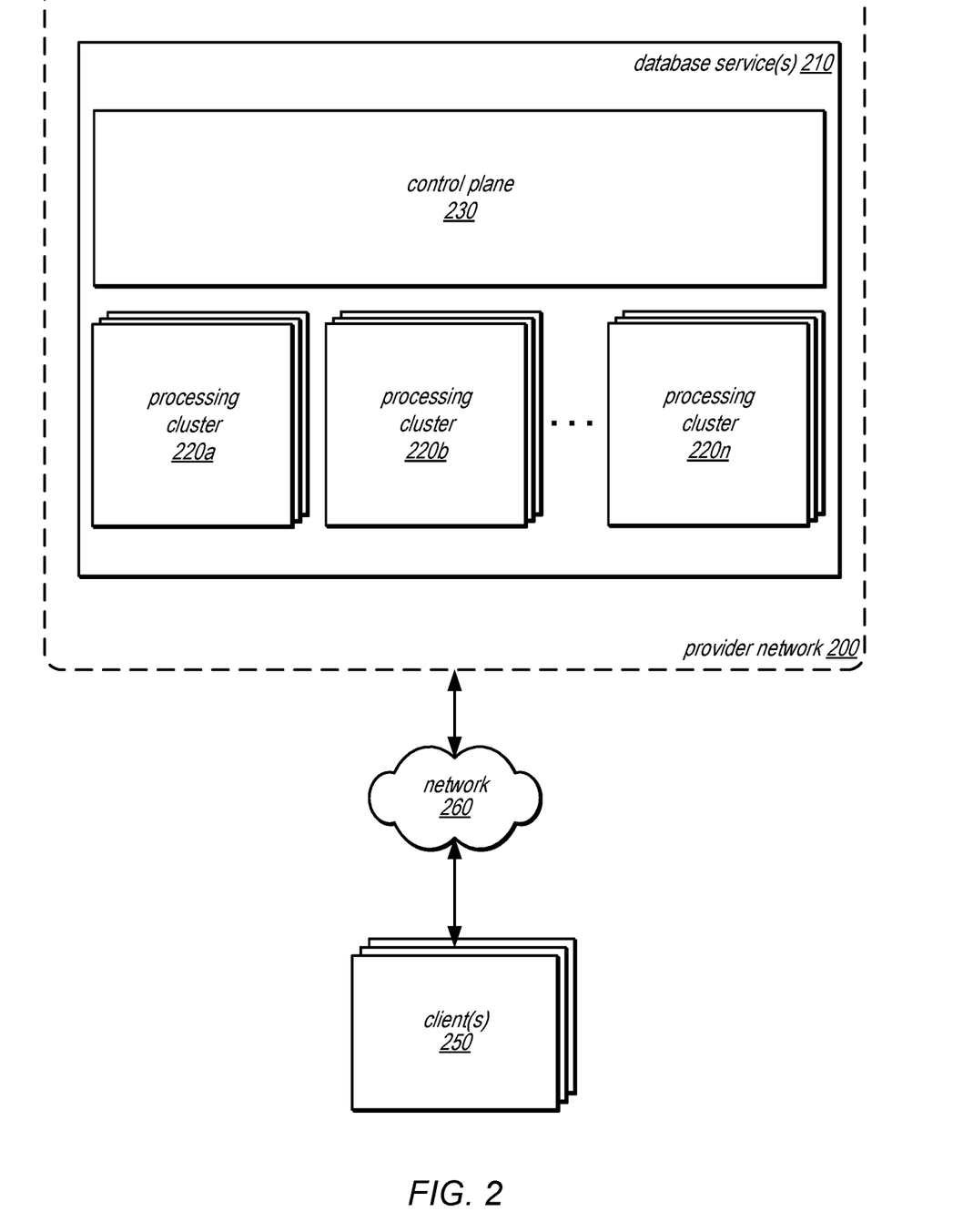
FIG. 2 is a logical block diagram illustrating a provider network offering a database service, according to some embodiments.

FIG. 2 is a logical block diagram illustrating a provider network offering a database service that implements enforcing foreign key constraints for efficient materialized view updates to materialized views of databases hosted in the provider network, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service, in one embodiment. In other embodiments, database services 210 may locally store, managed, and access semi-structured or not-structured data (e.g., an object-based and/or key-value data store that stores tables joined with tables in other services, such as database service(s) 210 or the same storage service).

Generally speaking, clients 250 may encompass any type of client that can submit network-based requests to provider network 200 via network 260, including requests for database service(s) (e.g., a request or other query to a database in database services 210, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database services 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, clients of database service(s) 210 may be internal to or implemented as part of provider network 200 (e.g., on another provider network service not illustrated).

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 may be coordinated by client 250 and the operating system or file system on behalf of applications executing within the operating system environment. Similarly, a client 250 may be an analytics application that relies upon database services to execute various queries for data already ingested or stored in the database service 210 or data stored in a data lake hosted in other storage service(s) in provider network 200 that may be accessible to a query engine implemented as part of database service(s) 210).

Clients 250 may convey network-based services requests (e.g., access requests to read or write data) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, a database service 210 may be a data warehouse service or other database that stores data across multiple storage locations (e.g., across different nodes in a processing cluster). A database service, such as database service 210, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes).

The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 8, in some embodiments. Different subsets of these computing devices may be controlled by control plane 230. Control plane 230, for example, may provide an interface to clients or users who wish to interact with the processing clusters 220 managed by control plane 230. For example, the interface may implement one or more Application Programming Interfaces (APIs) to allow client systems to programmatically invoke database service operations, functions, or other features and/or the interface may implement or provide one or more graphical user interfaces (GUIs) for storage clients (e.g., as a web-console). The interface may allow clients to select various control functions offered by database service 210 for the processing clusters 220 hosted in the database service 210, in some embodiments. For example, a user may make adjustments to workload allocations, prioritization schemes, cluster size, network mappings or other operations or tasks for performing a query.

In at least some embodiments, control plane 230 may implement cluster performance monitoring, which may track, store, organize and/or evaluate performance metrics collected for queries performed at processing clusters 220. For example, performance monitoring may receive reported metrics from a leader node, and store them in a common storage location (e.g., in a file, direct, or object within a storage service) for the database (or user account associated with the database). In some embodiments, performance monitoring may evaluate processing cluster performance in order to trigger the performance of various control plane 230 operations (e.g., node replacement or failover operations). In some embodiments, cluster scaling may be implemented as part of control plane 230 to respond to user requests to add or remove node from a processing cluster or automatically triggered requests/events to add or remove nodes (e.g., based on utilization thresholds for processing, storage, network, or other cluster resource).

Various clients (or customers, organizations, entities, or users) may wish to store and manage data using database service 210, in some embodiments. Processing clusters, such as processing clusters 220a, 220b, and 220n may respond to various requests, including write/update/store/redistribute requests (e.g., to add data into storage) or other queries for data (e.g., such as a Server Query Language request (SQL) for particular data), as discussed below with regard to FIG. 3, along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service, in some embodiments.

Multiple users or clients may access a processing cluster 220 to obtain data warehouse services, in one embodiment. In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 220 may provide an enterprise-class database query and management system that allows users to send data processing requests to be executed by the clusters 220, such as by sending a data processing request to a cluster control interface implemented by the processing clusters, in some embodiments. Processing clusters 220 may perform data processing operations with respect to data stored locally in a processing cluster. Requests sent to a processing cluster 220 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from the processing clusters, such as data stored in another service.

Processing clusters 220 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently, in various embodiments. In other embodiments, database service 210 and/or processing clusters 220 may offerquery capabilities may query over other types of data (e.g., semi-structured data, unstructured data, various other kinds of data, such as media, or no-schema data). Control plane 230 may direct scaling operations, as discussed above, to right-size a processing cluster 220 for efficiently processing queries.

Figure 3:
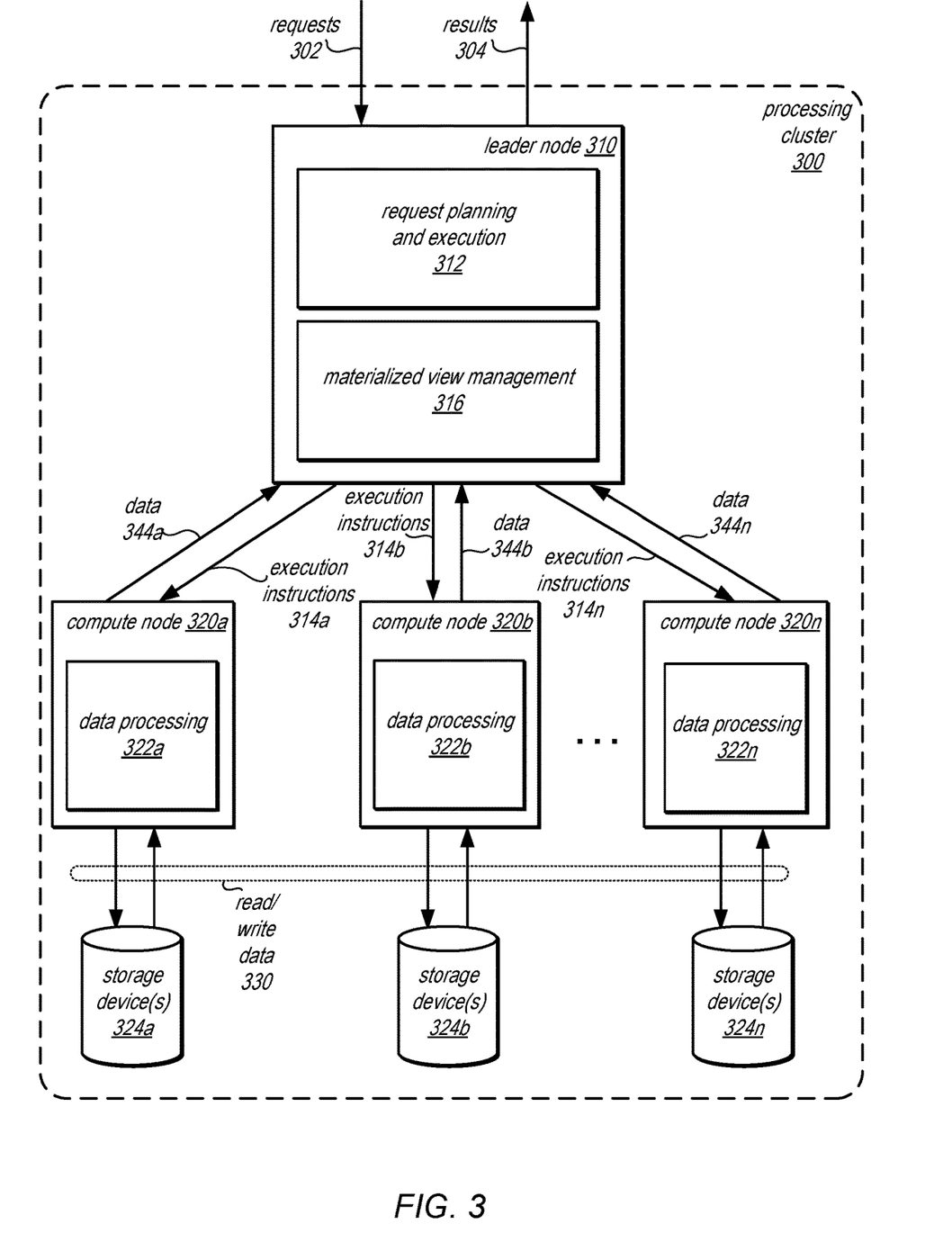
FIG. 3 is a logical block diagram illustrating a processing cluster of a database service that performs queries to a database hosted in the processing cluster that implements enforcing foreign key constraints for efficient materialized view updates to materialized views of databases hosted in the provider network, according to some embodiments.

FIG. 3 is a logical block diagram illustrating a processing cluster of a database service that performs queries to a database hosted in the processing cluster, according to some embodiments. Processing cluster 300 may be data warehouse service cluster, like processing clusters 220 discussed above with regard to FIG. 2, or another processing cluster that distributes execution of a query among multiple processing nodes, in one embodiment. As illustrated in this example, a processing cluster 300 may include a leader node 310 and compute nodes 320a, 320b, and 320n, which may communicate with each other over an interconnect (not illustrated), in one embodiment. Leader node 310 may implement request planning 312 to generate plan(s) and instructions 314 for executing various requests 302, such as query, or requests to update, add, modify, or remove data, on processing cluster 300, in one embodiment. Leader node 310 may implement materialized view management 316, discussed in detail below with regard to FIG. 4, to create and update materialized views. Leader node 310 may implement metric planning history/performance metric collection (not illustrated) to collect and report performance metrics collected for various events, units of work, or other portions a query or other operation's performance, compute node or leader node performance, and history of operations performed, such as join history which may be provided to generate join history graphs from a live database, in some embodiments. As described herein, each node in a processing cluster 300 may include attached storage, such as storage device(s) 324a, 324b, and 324n, on which a database, including tables and materialized views (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 300 is a leader node as illustrated in FIG. 3, but rather different nodes of the nodes in processing cluster 300 may act as a leader node or otherwise direct processing of requests to data stored in processing cluster 300, in one embodiment. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2, in one embodiment. For example, leader node 310 may be a server that receives an access request (e.g., a query for data or a request to add data) 302 from various client programs (e.g., applications) and/or subscribers (users), then parses them and develops an execution plan (e.g., query plan(s)) to carry out the associated database operation(s).

Leader node 310 may develop the series of steps necessary to obtain results for query 302, in one embodiment. Query 302 may be a query directed to a database table that is stored within processing cluster 300 (e.g., at one or more of compute nodes 320), in one embodiment. Leader node 310 may also manage the communications among compute nodes 320 instructed to carry out database operations for data stored in the processing cluster 300, in one embodiment. For example, node-specific request instructions 314 may be generated or compiled code that is distributed by leader node 310 to various ones of the compute nodes 320 to carry out the steps needed to perform a query or other operation in request 302, including executing the code to generate intermediate results of request 302 at individual compute nodes that may be sent back to the leader node 310, in one embodiment. Leader node 310 may receive data and responses or results (e.g., data 344a, 344b, and 344c) from compute nodes 320 in order to determine a final result for a request, in one embodiment. A database schema, data format and/or other metadata information for the data stored among the compute nodes, such as the data tables stored in the cluster, may be managed and stored by leader node 310 or obtained from a separate store (e.g., a data catalog service), in some embodiments. Request planning 312 may include the generation and selection of a plan to perform requests 302, in some embodiments.

Processing cluster 300 may also include compute nodes, such as compute nodes 320a, 320b, and 320n. Compute nodes 320, may for example, be implemented on servers or other computing devices, such as those described below with regard to computer system 1000 in FIG. 8, and each may include individual query processing "slices" defined, for example, for each core of a server's multi-core processor, one or more data processing engine(s), such as data processing 322a, 322b, and 322n, to execute the instructions 314 or otherwise perform the portions of the request plan assigned to the compute node, in one embodiment. Data processing 322 may access a certain memory and disk space in order to process a portion of the workload for a request that is sent to one or more of the compute nodes 320. Data processing 322 may access attached storage, such as 322a, 322b, and 322n, to perform operation(s), in one embodiment. For example, data processing 322 may scan data in attached storage 324, access indexes, perform joins, semi joins, aggregations, or any other processing operation assigned to the compute node 320, in one embodiment. Compute nodes 320 may send intermediate or final results from requests back to leader node 310 for final result generation (e.g., combining, aggregating, modifying, joining, etc.). Data, such as a database table, may be partitioned or otherwise distributed across the storage device(s) 324 as different partitions or shards of the data, in some embodiments. Compute nodes 320 may receive instructions specific to the shard(s) or partition(s) of the data to which the compute node 320 has access. Compute nodes 320 may implement metrics collection agents (not illustrated) in order to obtain the various performance metrics that may be collected for performing performance analysis for query planning, optimization, and execution of subsequent database queries.

Storage device(s), such as storage devices 324a, 324b, and 324n, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
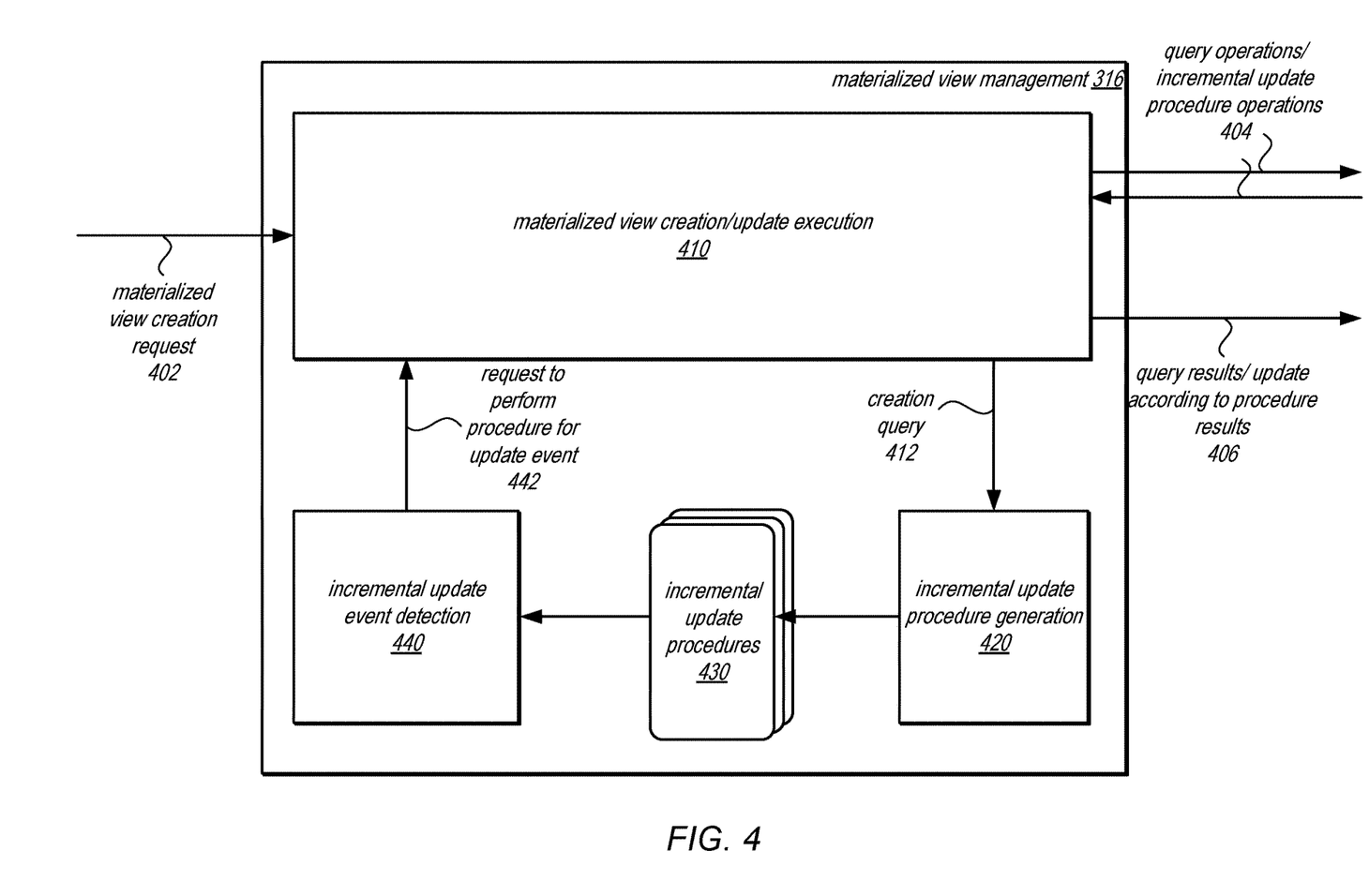
FIG. 4 is a block diagram illustrating materialized view management that implements enforcing foreign key constraints for efficient materialized view updates, according to some embodiments.

FIG. 4 is a block diagram illustrating materialized view management that implements enforcing foreign key constraints for efficient materialized view updates, according to some embodiments. As discussed above, materialized view management 316 may create and update materialized views of tables stored in processing cluster 300. Materialized view management 316 may implement materialized view creation and update execution 410 to direct, request, or otherwise perform operations to handle a request 402 to create a materialized view or a request 442 to perform a procedure for an update event. Materialized view creation and update execution 410 may perform various operations 404 with respect to processing nodes to request data, provide instructions, combine results, and so on, in order to store query results as a new materialized view or update an existing materialized view according to procedure results, as indicated at 406.

Materialized view management 316 may implement incremental update procedure generation 420, which may perform various techniques to generate a procedure 430 that is used 422 for incremental updates to a materialized view. For example, incremental update procedure generation may perform dynamic procedure generation, on-the-fly or as needed, when for instance an update event is detected, in some embodiments. In other embodiments, incremental update procedure generation may store incremental update procedures 430 for subsequent use. As discussed in detail below with regard to FIG. 7, incremental update procedure generation 420 may identify and remove join operations for that would not satisfy a foreign key constraint so that incremental update procedures 430 do not include such join operations.

Materialized view management may implement incremental update event detection 440 to detect different events that cause performance of an incremental update. For example, incremental update event detection 440 may monitor for updates to a database and detect an event when, for instance, a single update to the database is performed (e.g., when a transaction is complete or committed) or other scenarios, such as where a threshold amount of change to the database has occurred or threshold amount of time since the change has passed. In some embodiments, incremental update event detection 440 may hold or suspend the performance of an update event until current workload at a processing cluster falls below a threshold amount to not interfere with other work. In some embodiment's, incremental update event detection 440 may receive a user request (or handle one) to update the materialized view. Incremental update event detection 440 may obtain the appropriate incremental update procedure 430 and send a request 442 to materialized view creation and update execution 410 to perform the procedure(s) to update the materialized view.

Figure 5:
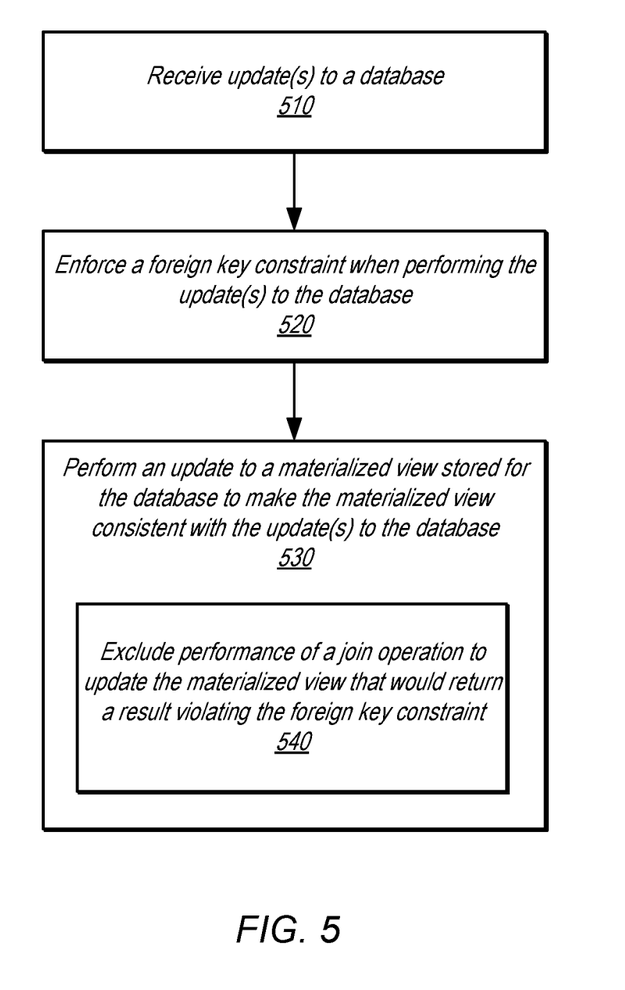
FIG. 5 is a high-level flowchart illustrating methods and techniques to perform enforcing foreign key constraints for efficient materialized view updates, according to some embodiments.

Although FIGS. 2-4 have been described and illustrated in the context of a database service, like a data warehouse service implementing a columnar relational database table, the various components illustrated and described in FIGS. 2-4 may be easily applied to other database or data storage systems that provide materialized views of database data. As such, FIGS. 2-4 are not intended to be limiting as to other embodiments of a storage engine, query engine, processing cluster, or other component that may implement using computer resources to perform the creation of and updates to materialized views, including resources, hosts, systems, or devices that are separate from the query engine or database management system itself (e.g., an external data replication store or system). FIG. 5 is a high-level flowchart illustrating methods and techniques to perform enforcing foreign key constraints for efficient materialized view updates, according to some embodiments. Various different systems and devices may implement the various methods and techniques described below, either singly or working together. For example, a processing cluster, such as described above with regard to FIGS. 2-4 may implement the various methods. Alternatively, a combination of different systems and devices may implement the described techniques. Therefore, the above examples and or any other systems or devices referenced as performing the illustrated method, are not intended to be limiting as to other different components, modules, systems, or configurations of systems and devices.

As indicated at 510, one or more updates to a database may be received, in various embodiments. For example, updates may update data values that are in existing records (e.g., tuples), add new records, delete records, or change the schema for the database. The updates may be received via query language or other programmatic interface, in some embodiments.

Figure 7:
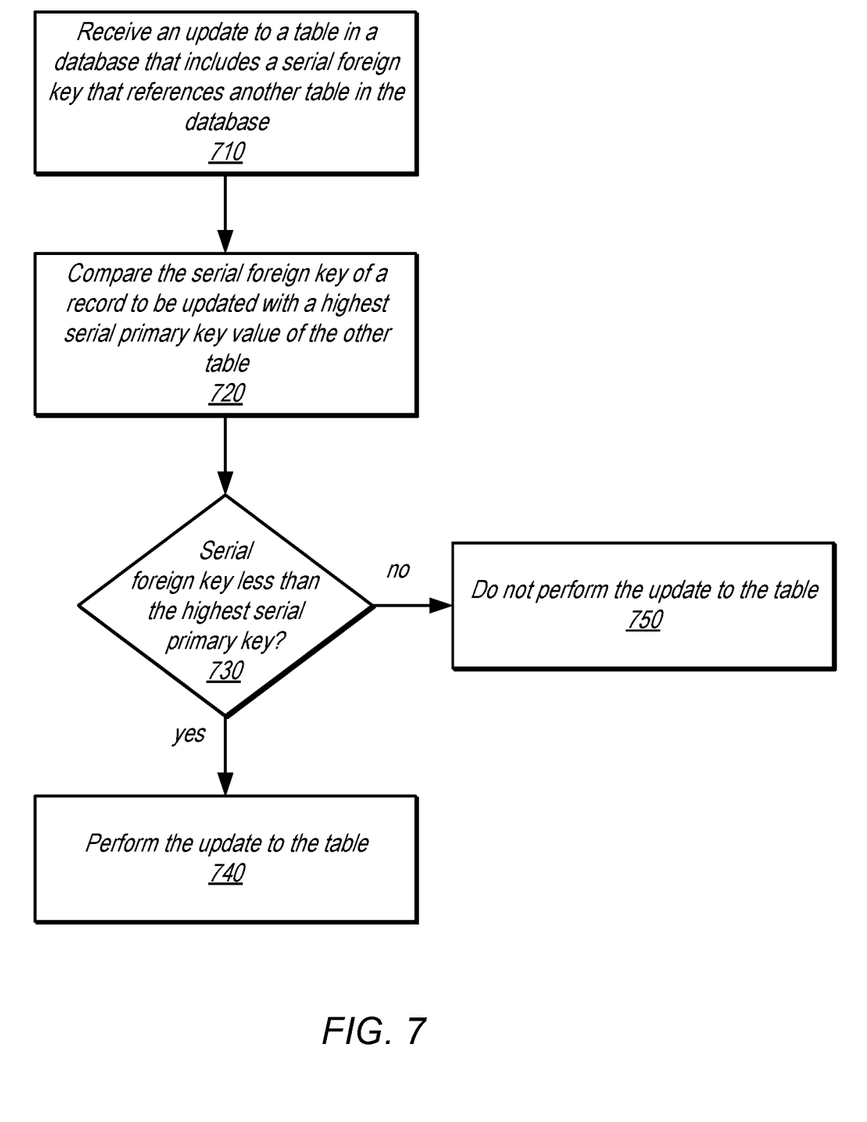
FIG. 7 is a high-level flowchart illustrating methods and techniques to enforce a foreign key constraint according to serial foreign keys and serial primary keys, according to some embodiments.

As indicated at 520, a foreign key constraint may be enforced when performing the update(s) to the database, in various embodiments. For example, when an update to add a record or modify a record is received, the foreign key value for that record may be compared with primary key values of another table to detect if a matching primary key value is found (e.g., by utilizing search trees, indexes, or other efficient comparison techniques). If not, then the updates may not be performed (e.g., a transaction may fail, an error or denial response may be sent, etc.). If the matching primary key is found, then the update may be performed. FIG. 7 discusses other techniques for enforcing a foreign key constraint that may be implemented in some embodiments.

As indicated at 530, an update to a materialized view stored for the database may be performed to make the materialized view consistent with the update(s) to the database, in some embodiment's. For example, as discussed above, procedures (e.g., generated dynamically or previously generated and stored) with optimized query operations to obtain or search for the difference values can be performed, in some embodiments, reducing the cost of performing the update. In other embodiments, a query plan may be generated and executed to re-run the query that generated materialized view.

As indicated at 540, as part of performing the update, performance of a join operation to update the materialized view that would return a result violating the foreign key constraint may be excluded, in various embodiments, because application of the foreign key constraint may guarantee that the join operation would produce no results. For example, the update to the materialized view as described in a pre-stored or pre-generated procedure may exclude such an operation from the set of operations describing how to perform the update because when generating the procedure joins between tables linked by a foreign key constraint may be flagged by a procedure generation or planning rule that applies a list or set of known foreign key constraints as obtained from database schema information to the tables included in a query to see if any such table is subject to a foreign key constraint. In embodiments that generate a plan to perform the update dynamically (e.g., by re-running the query), a planning or optimization rule to identify and remove a join operation from the generated plan may be performed, similar to the techniques discussed below with regard to FIG. 6. Various other update operations (including joins for data that would not violate the foreign key constraint may still be performed and the updates made to the materialized view in storage.

As discussed above with regard to FIG. 4, different requests or other events may trigger the performance of the update, in various embodiments. Such as the performance of the updates, a timer or counter tracking the amount of time or amount of change since a last update, user requests to update the materialized view, and/or a user query that references or uses the materialized view may cause performance of the update.

Figure 6:
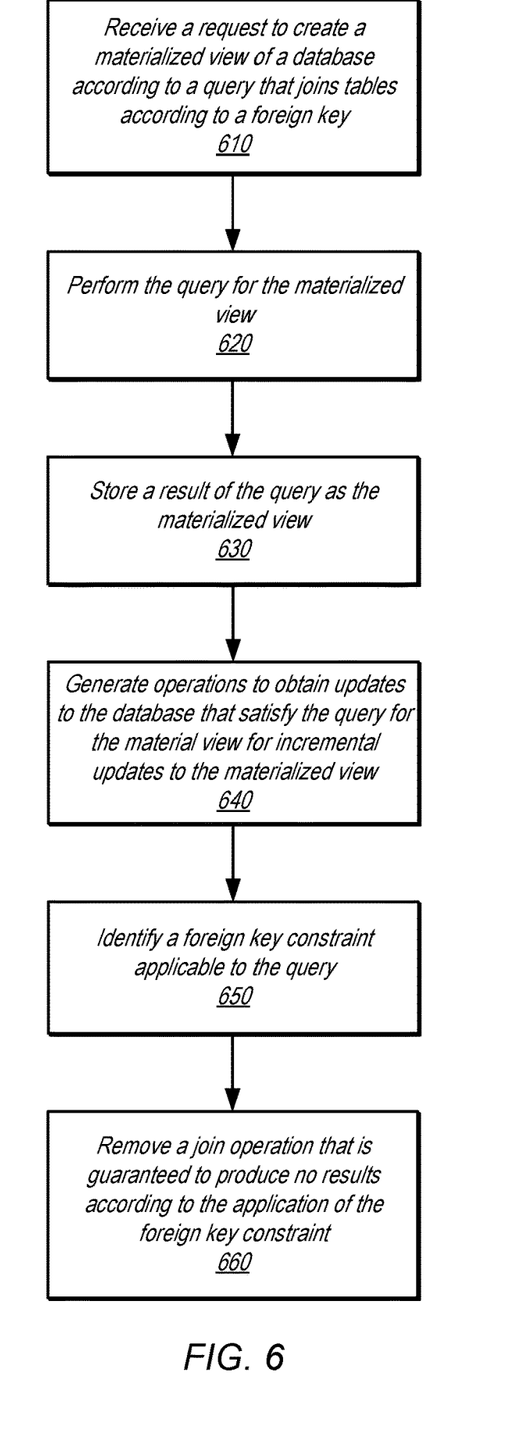
FIG. 6 is a high-level flowchart illustrating methods and techniques to remove a join operation that violates a foreign key constraint for updating a materialized view, according to some embodiments.

FIG. 6 is a high-level flowchart illustrating methods and techniques to remove a join operation that violates a foreign key constraint for updating a materialized view, according to some embodiments. As indicated at 610, a request to create a materialized view of a database may be received according to a query that joins tables (e.g., two or more) according to a foreign key. For example, star or snowflake schemas that provide a framework for relationships between tables may include a foreign key to establish the relationships.

As indicated at 620, the query for the materialized view may be performed. For instance, a query plan may be developed and executed with respect to stored data in the database to generate a result according to the query plan. As indicated at 630, the result of the query may be stored as the materialized view, in various embodiments. Metadata or other information at the database indicating that the materialized view is "active" or otherwise available to be queried may be updated. Such materialized view status information may also reflect when updates to a database cause the materialized view to be non-consistent with the source tables for the materialized view.

As indicated at 640, operations to obtain incremental updates to the database that satisfy the query for the materialized view may be generated, in some embodiments. For example, operations that identify differences in values (or additional values) to effected tables may be performed (e.g., by viewing table metadata that indicates if and when a table was last updated). Various rule-based techniques for generating and optimizing such operations may be implemented.

As indicated at 650, a foreign key constraint may be identified as applicable to the query. For example, WHERE statement that joins two (or more tables) by a foreign key in the original query may be identified as applying a foreign key constraint. As indicated at 660, an operation that includes a join operation that is guaranteed to produce no results according to the application of the foreign key constraint may be removed from the generated operations. For example, a rule-based technique may identify whether any of the updates were made to a referenced table (e.g., adding new records and thus adding new primary keys, and if so remove a join operation that evaluates whether tuples already present in the referencing table (e.g., that stores the primary key) match the updates to the referenced table (e.g., as no record in the referencing table could be stored if it had not already been matched with the primary key in the referenced table and the "new" primary keys of the new records would not have a match).

Serial primary keys may provide increasing primary key values (e.g., atomically increasing) that are unique to records in table as they are stored in a table. Serial foreign keys may reference a serial primary key. When a request to create a table is received, the schema specified for the table may designate a serial primary key or a serial foreign key for the table. When an item is added to a table, the database increments or otherwise increases the primary key value for the immediately previous item to generate a new, increased primary key value for the item. Serial primary keys may, in some embodiments, be automatically generated for new items upon insertion (e.g., without a request to insert the item specifying the value of the primary key). FIG. 7 is a high-level flowchart illustrating methods and techniques to enforce a foreign key constraint according to serial foreign keys and serial primary keys, according to some embodiments.

As indicated at 710, an update to a table in a database may be received that includes a serial foreign key that references another table in the database. The update to the table may include any operation that modifies the table contents (e.g., updates records or items, adds or inserts content, such as adding or inserting new records in the able, or removes content, such as deleting records). As indicated at 720, the serial foreign key of a record to be updated may be compared with a highest serial primary key value of the other table, in some embodiments. For example, a quick scan of primary serial key values can be performed. In other embodiments, a counter value may be increased as records are added to correspond to the new serial primary key value.

If the serial foreign key is less than the highest serial primary key, as indicated by the positive exit from 730, the update to the table can be performed, as indicated at 740, in various embodiment's. In one embodiment, a foreign key value less than the highest serial primary key value would be guaranteed to be present in the other table (or at least present in the past before a deletion) because of the monotonically increasing primary key values (although in other embodiments the serial primary key value may be present not necessarily so if a non-monotonically increasing serial primary key value scheme is implemented). If the serial foreign key is higher, then the update to the table may not be performed, as indicated at 750.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of using computer resources to perform enforcing foreign key constraints for efficient materialized view updates as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 8:
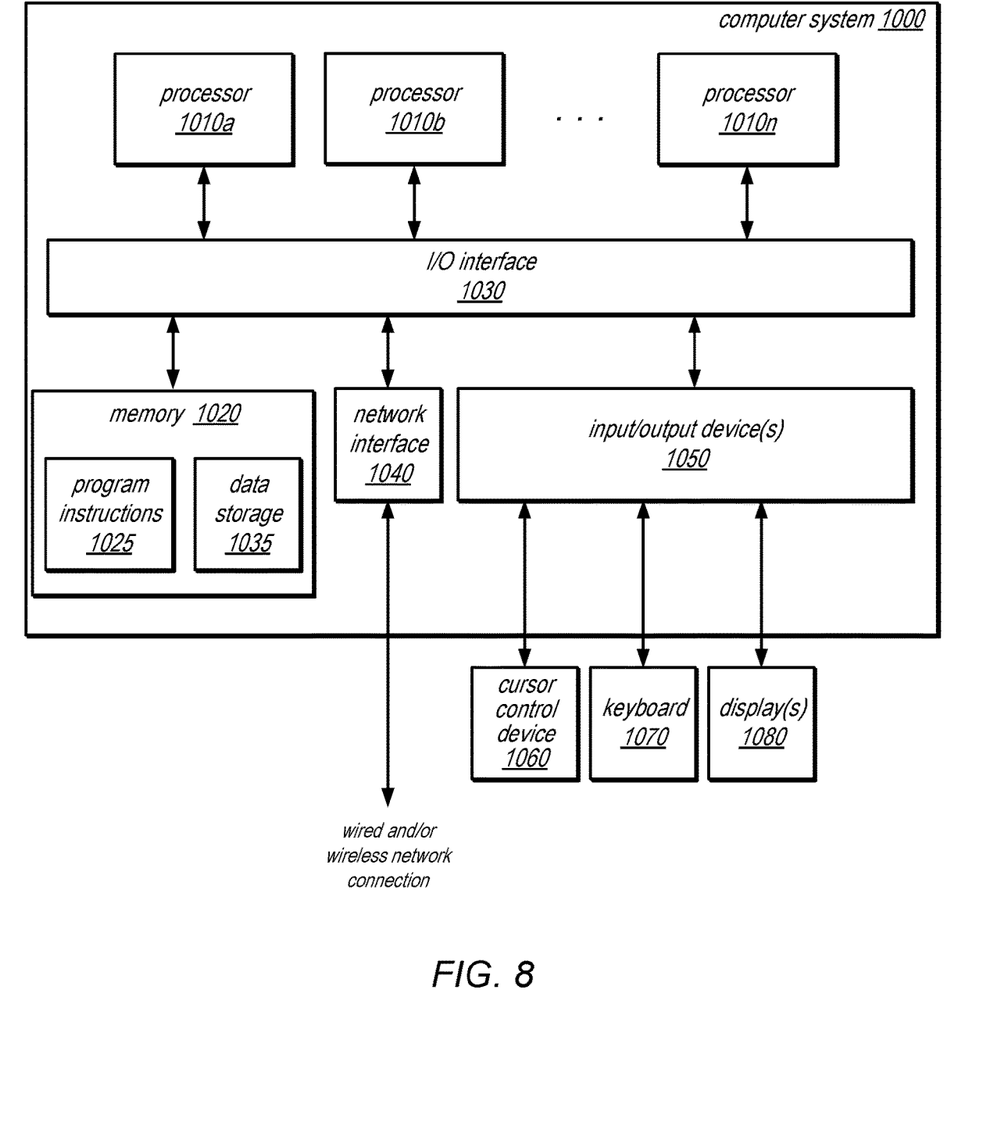
FIG. 8 illustrates an example system to implement the various methods, techniques, and systems described herein, according to some embodiments.

As shown in FIG. 8, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more storage devices that store data for a database;
   at least one processor; and
   a memory, storing program instructions that when executed by the at least one processor cause the at least one processor to implement the database;
   the database, configured to:
   receive one or more updates to the database;
   enforce a foreign key constraint included in a schema for the database when performing the one or more updates;
   detect an event that causes an update to a materialized view stored for the database;
   responsive to the event, perform the update to the materialized view to make the materialized view consistent with the one or more updates to the database, wherein the performance excludes a join operation to update the materialized view that would return results violating the foreign key constraint.

2. The system of claim 1, wherein the database is further configured to:
   receive a request to create the materialized view of the database according to a query;
   generate one or more operations to obtain updates to the database that satisfy the query for the materialized view for incremental updates to the materialized view;
   identify the foreign key constraint as applicable to the query;

remove a join operation from the generated operations that would return results that would violate the foreign key constraint; and wherein the update to the materialized view is performed according to remaining operations.

3. The system of claim 1, wherein the one or more updates include an update to a first table in the database, wherein the first table is created with the schema that includes a foreign serial key that references a primary serial key included in a second table in the database, and wherein to enforce the foreign key constraint included in the schema for the database when performing the one or more updates, the database is configured to:

determine a value of the serial foreign key for the update;
compare the respective values of the serial foreign keys with a highest serial primary key for the second table;
responsive to determining that the serial foreign key is less than the highest serial primary key, perform the update to the first table.

4. The system of claim 1, wherein the database is implemented at a processing cluster of a data warehouse service offered in a provider network.

5. A method, comprising:

enforcing a foreign key constraint when performing one or more updates to a database;
performing an update to a materialized view stored for the database to make the materialized view consistent with the one or more updates to the database, comprising:
excluding performance of a join operation to update the materialized view that would return results violating the foreign key constraint.

6. The method of claim 5, further comprising:

receiving a request to create the materialized view of the database according to a query;
generating one or more operations to obtain updates to the database that satisfy the query for the materialized view for incremental updates to the materialized view;
identifying the foreign key constraint as applicable to the query;
removing a join operation from the generated operations that would return results that would violate the foreign key constraint; and
wherein the update to the materialized view is performed according to remaining operations.

7. The method of claim 5, further comprising:

storing the remaining operations for performing the update to the materialized view of the database;
receiving additional updates to the database; and
performing the remaining operations to perform another update to the materialized view of the database.

8. The method of claim 5, wherein performing the update to the materialized view stored for the database to make the materialized view consistent with the one or more updates to the database, further comprises generating one or more operations to perform the update; and
wherein excluding performance of a join operation from a query used to create the materialized view that would return results violating the foreign key constraint comprises removing the join operation from the generated operations to perform the update to the materialized view.

9. The method of claim 5, further comprising query to the database from a client application that references the materialized view, wherein the query causes the performing of the update to the materialized view.

10. The method of claim 5, wherein performing the update to the materialized view comprises determining that a workload of the database is below an update threshold.

11. The method of claim 5, wherein enforcing the foreign key constraint when performing one or more updates to a database comprises determining that an update to a first table with a schema including a foreign key referencing a primary key in a second table has a value for the foreign key that matches a value of a primary key of a record in the second table.

12. The method of claim 5, wherein the one or more updates include an update to a first table in the database, wherein the first table is created with the schema that includes a serial foreign key that references a primary serial key included in a second table in the database, and wherein enforcing the foreign key constraint when performing one or more updates to the database comprises:

determining a value of the serial foreign key for the update;
comparing the respective values of the serial foreign keys with a highest serial primary key for the second table;
responsive to determining that the serial foreign key is less than the highest serial primary key, performing the update to the first table.

13. The method of claim 12, further comprising:

before receiving the one or more updates to the database:
receiving a request to create the first table with the serial foreign key;
receiving a request to create the second table with the serial primary key; and
creating the first table and the second table in accordance with the requests.

14. One or more non-transitory, computer-readable storage media, storing program instructions that when executed on or across one or more computing devices cause the one or more computing devices to implement:

receiving one or more updates to a database;
enforcing a foreign key constraint when performing the one or more updates to the database;
performing an update to a materialized view stored for the database to make the materialized view consistent with the one or more updates to the database, comprising:
excluding performance of a join operation to update the materialized view that would return results violating the foreign key constraint.

15. The one or more non-transitory, computer-readable storage media of claim 14, wherein the one or more non-transitory, computer-readable storage media store further instructions that when executed by the one or more computing devices cause the one or more computing devices to further implement:

receiving a request to create the materialized view of the database according to a query;
generating one or more operations to obtain updates to the database that satisfy the query for the materialized view for incremental updates to the materialized view;
identifying the foreign key constraint as applicable to the query;
removing a join operation from the generated operations that would return results that would violate the foreign key constraint; and
wherein the update to the materialized view is performed according to remaining operations.

16. The one or more non-transitory, computer-readable storage media of claim 14, wherein the one or more non-transitory, computer-readable storage media store further instructions that when executed by the one or more computing devices cause the one or more computing devices to further implement detecting an event that automatically causes the performing of the update to the materialized view.

17. The one or more non-transitory, computer-readable storage media of claim 14, wherein the one or more non-transitory, computer-readable storage media store further instructions that when executed by the one or more computing devices cause the one or more computing devices to further implement receiving a request to update the materialized view from a client application, wherein the request to update the materialized view causes the performing of the update to the materialized view.

18. The one or more non-transitory, computer-readable storage media of claim 14, wherein the one or more updates include an update to a first table in the database, wherein the first table is created with the schema that includes a serial foreign key that references a primary serial key included in a second table in the database, and wherein, in enforcing the foreign key constraint when performing one or more updates to the database, the program instructions when executed by the one or more computing devices cause the one or more computing devices to further implement:
   determining a value of the serial foreign key for the update;
   comparing the respective values of the serial foreign keys with a highest serial primary key for the second table;
   responsive to determining that the serial foreign key is less than the highest serial primary key, performing the update to the first table.

19. The one or more non-transitory, computer-readable storage media of claim 18, wherein the one or more non-transitory, computer-readable storage media store further instructions that when executed by the one or more computing devices cause the one or more computing devices to further implement:
   before receiving the one or more updates to the database:
      receiving a request to create the first table with the serial foreign key;
      receiving a request to create the second table with the serial primary key; and
      creating the first table and the second table in accordance with the requests.

20. The one or more non-transitory, computer-readable storage media of claim 14, wherein the one or more computing devices are implemented as part of a database service in a provider network.

* * * * *